US012572223B2

(12) United States Patent
Imata

(10) Patent No.: US 12,572,223 B2
(45) Date of Patent: Mar. 10, 2026

(54) CONTROLLER AND COMPUTER

(71) Applicant: Wacom Co., Ltd., Saitama (JP)

(72) Inventor: Futa Imata, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/895,218

(22) Filed: Sep. 24, 2024

(65) Prior Publication Data

US 2025/0036212 A1 Jan. 30, 2025

Related U.S. Application Data

(63) Continuation of application No. PCT/JP2022/047895, filed on Dec. 26, 2022.

(30) Foreign Application Priority Data

Mar. 25, 2022 (JP) .................................. 2022-049337

(51) Int. Cl.
| | |
|---|---|
| *G06F 3/0346* | (2013.01) |
| *G06F 3/01* | (2006.01) |
| *G06F 3/03* | (2006.01) |
| *G06F 3/0354* | (2013.01) |

(52) U.S. Cl.
CPC ............ *G06F 3/0346* (2013.01); *G06F 3/011* (2013.01); *G06F 3/0304* (2013.01); *G06F 3/03545* (2013.01)

(58) Field of Classification Search
CPC ...... G06F 3/0346; G06F 3/011; G06F 3/0304; G06F 3/03545; G06F 3/01; G06F 3/038; G06F 3/04815
See application file for complete search history.

(56) References Cited

U.S. PATENT DOCUMENTS

| | | | | | |
|---|---|---|---|---|---|
| 5,818,424 | A | * | 10/1998 | Korth .................. | G06F 3/03545 |
| | | | | | 345/158 |
| 9,229,540 | B2 | * | 1/2016 | Mandella ................ | G06F 3/011 |
| 9,443,311 | B2 | * | 9/2016 | Hallett .................... | G06T 7/521 |
| 10,249,090 | B2 | * | 4/2019 | Balan ...................... | G06F 3/012 |
| 11,593,963 | B2 | * | 2/2023 | Cohen ...................... | G06T 7/75 |
| 2005/0026689 | A1 | * | 2/2005 | Marks ................... | G06F 3/0346 |
| | | | | | 463/36 |
| 2005/0037844 | A1 | * | 2/2005 | Shum .................... | A63F 13/212 |
| | | | | | 463/36 |

(Continued)

FOREIGN PATENT DOCUMENTS

| | | |
|---|---|---|
| JP | 2021518953 A | 8/2021 |
| WO | WO 2019220803 A1 | 11/2019 |

OTHER PUBLICATIONS

Artag, AprilTag and CALTag Fiducial Systems Comparison in a Presence of Partial Rotation: (Year: 2020).*

(Continued)

*Primary Examiner* — Bryan Earles
(74) *Attorney, Agent, or Firm* — Seed Intellectual Property Law Group LLP

(57) ABSTRACT

Provided is a controller including a housing and a position indicator that is provided at a front end of the housing and indicates a position in a space. The housing includes a marker provided along a circumferential direction on a side surface of the housing, the marker including a code for detecting a rotation angle about a housing shaft of the housing.

8 Claims, 5 Drawing Sheets

(56)                    References Cited

U.S. PATENT DOCUMENTS

| 2008/0122786 | A1* | 5/2008 | Pryor | .................... A63F 13/00 |
| | | | | 345/156 |
| 2008/0167818 | A1* | 7/2008 | Kimber | ............. G01B 11/2509 |
| | | | | 700/83 |
| 2020/0042111 | A1* | 2/2020 | Connellan | ............... G06F 3/017 |
| 2020/0333891 | A1* | 10/2020 | Poore | ................... G06F 3/0304 |
| 2022/0184489 | A1* | 6/2022 | Nishikawa | ........... G06F 3/0304 |

OTHER PUBLICATIONS

Maidi, M., Didier, JY., Ababsa, F. et al. A performance study for camera pose estimation using visual marker based tracking. Machine Vision and Applications 21, (2010). https://doi.org/10.1007/s00138-008-0170-y (Year: 2010).*

F. Bergamasco, A. Albarelli, E. Rodolà and A. Torsello, "RUNE-Tag: A high accuracy fiducial marker with strong occlusion resilience," CVPR 2011, Colorado Springs, CO, USA, 2011, pp. 113-120, doi: 10.1109/CVPR.2011.5995544. (Year: 2011).*

International Search Report dated Mar. 20, 2023, for the corresponding International Patent Application No. PCT/JP2022/047895, 5 pages. (With English Translation).

Nobuyoshi Hashimoto, "Cylindrical marker for real-time tracking of pen-shaped implements," IEEE Japan, Jun. 2, 2018, pp. 17-20, 4 pages.

* cited by examiner

F I G . 5 A
F I G . 5 B
F I G . 5 C
F I G . 6
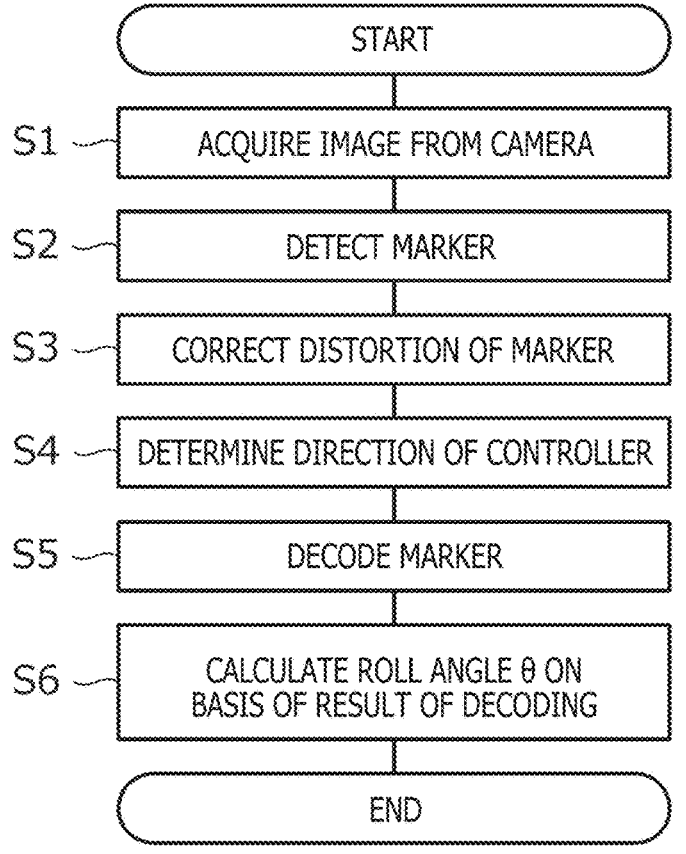

CONTROLLER AND COMPUTER

BACKGROUND

Technical Field of the Invention

The present disclosure relates to a controller and a computer, and particularly, to a pen-shaped controller used in a space (hereinafter, referred to as an "extended reality (XR) space") provided by an XR technique, such as virtual reality (VR), augmented reality (AR), mixed reality (MR), and substitutional reality (SR), and a computer that can communicate with such a controller.

Description of the Related Art

A user uses a pen-shaped controller in some cases to indicate a position in an XR space. An example of such a controller is disclosed in PCT Patent Publication No. WO2019/220803.

An example of a method of detecting the posture of the controller in the XR space includes a method of arranging a marker on the surface of the controller and using an optical device, such as a camera, and imaging the marker to recognize the feature, thereby detecting the posture of the controller. However, it is difficult to use the marker to detect the posture in the conventional pen-shaped controller.

BRIEF SUMMARY

Therefore, the present disclosure provides a pen-shaped controller that can use a marker to detect the posture and a computer that uses the marker to detect the posture of the pen-shaped controller.

An embodiment of the present disclosure provides a pen-shaped controller including a housing and a position indicator that is provided at a front end of the housing and, in operation, indicates a position in a space, wherein the housing includes a marker provided along a circumferential direction on a side surface of the housing, and wherein the marker includes a code that enable detection of a rotation angle about a housing shaft of the housing.

An embodiment of the present disclosure provides a computer that detects a posture of a controller, the controller including a housing and a position indicator that is provided at a front end of the housing and indicates a position in a space, and the controller including a marker provided along a circumferential direction on a side surface of the housing, the marker including a code that enable detection of a roll angle that is a rotation angle about a housing shaft of the housing, and the computer including a processor; and a memory storing instructions that, when executed by the processor, cause the computer to: acquire an image of the controller through an imaging device, decode the marker included in the image, and detect the roll angle based on a result of decoding the marker.

According to the present disclosure, the pen-shaped controller that can use the marker to detect the posture and the computer that uses the marker to detect the posture of the pen-shaped controller can be provided.

BRIEF DESCRIPTION OF THE SEVERAL VIEWS OF THE DRAWINGS

FIGS. 5A to 5C depict examples of a first figure;

FIG. 6 is a process flow chart illustrating a process executed by the image processing apparatus to acquire a roll angle of the controller.

DETAILED DESCRIPTION

An embodiment of the present disclosure will be described in detail with reference to the attached drawings.

Figure 1:
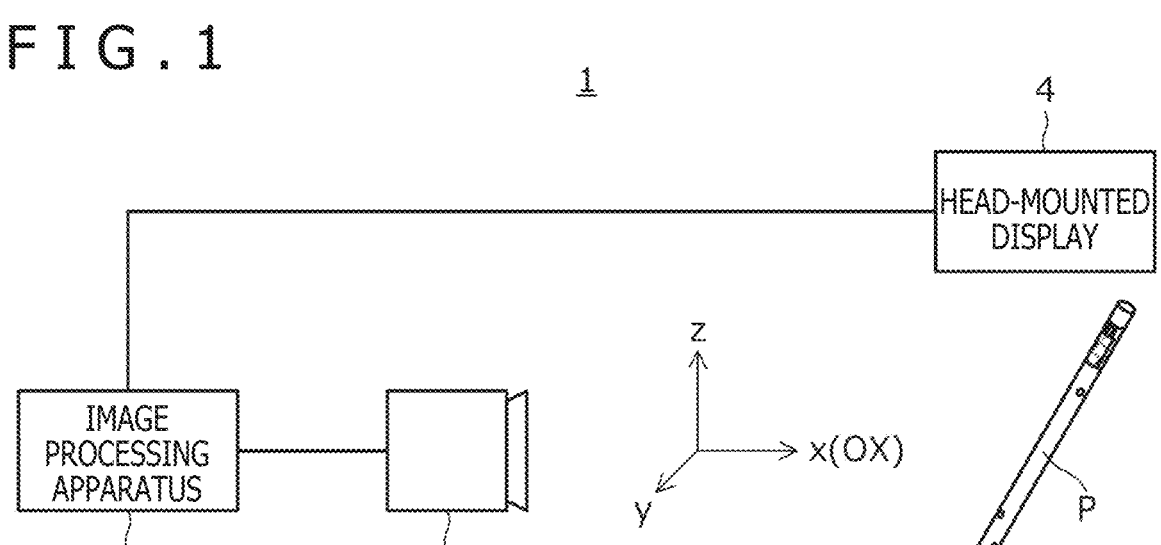
FIG. 1 depicts a pen-shaped controller according to an embodiment of the present disclosure and an XR system that generates an XR space.

FIG. 1 depicts a pen-shaped controller P according to the present embodiment and an XR system 1 that generates an XR space. As illustrated in FIG. 1, the XR system 1 includes an image processing apparatus 2, a camera 3, and a head-mounted display 4. Among them, the head-mounted display 4 is of a type of display apparatus mounted on the head of a user. The user wears the head-mounted display 4 and operates the controller P while viewing the XR space displayed on the display surface of the head-mounted display 4.

The camera 3 is an imaging device arranged at a position where the camera 3 can photograph the controller P, and the camera 3 is arranged such that an optical axis OX is level. An x direction illustrated in FIG. 1 is a direction of the optical axis OX, and a y direction is a direction orthogonal to the x direction in the horizontal plane. A z direction is a vertical direction, and the z direction corresponds to an up-and-down direction of an image photographed by the camera 3.

The image processing apparatus 2 is a computer that can execute an XR application for generating the XR space, and the image processing apparatus 2 is connected to the camera 3 and the head-mounted display 4. The XR application has a function of detecting the position and the posture of the controller P on the basis of the image of the controller P photographed by the camera 3. The image processing apparatus 2 executing the XR application detects the position and the posture of the controller P on the basis of the image of the camera 3 and generates a 3D object representing the controller P on the basis of the detected result. The image processing apparatus 2 then arranges the 3D object in the generated XR space and renders the XR space. The image processing apparatus 2 outputs the result of rendering to the head-mounted display 4. In this way, the user can operate the controller P in the XR space while viewing the 3D object of the controller P.

Figure 2:
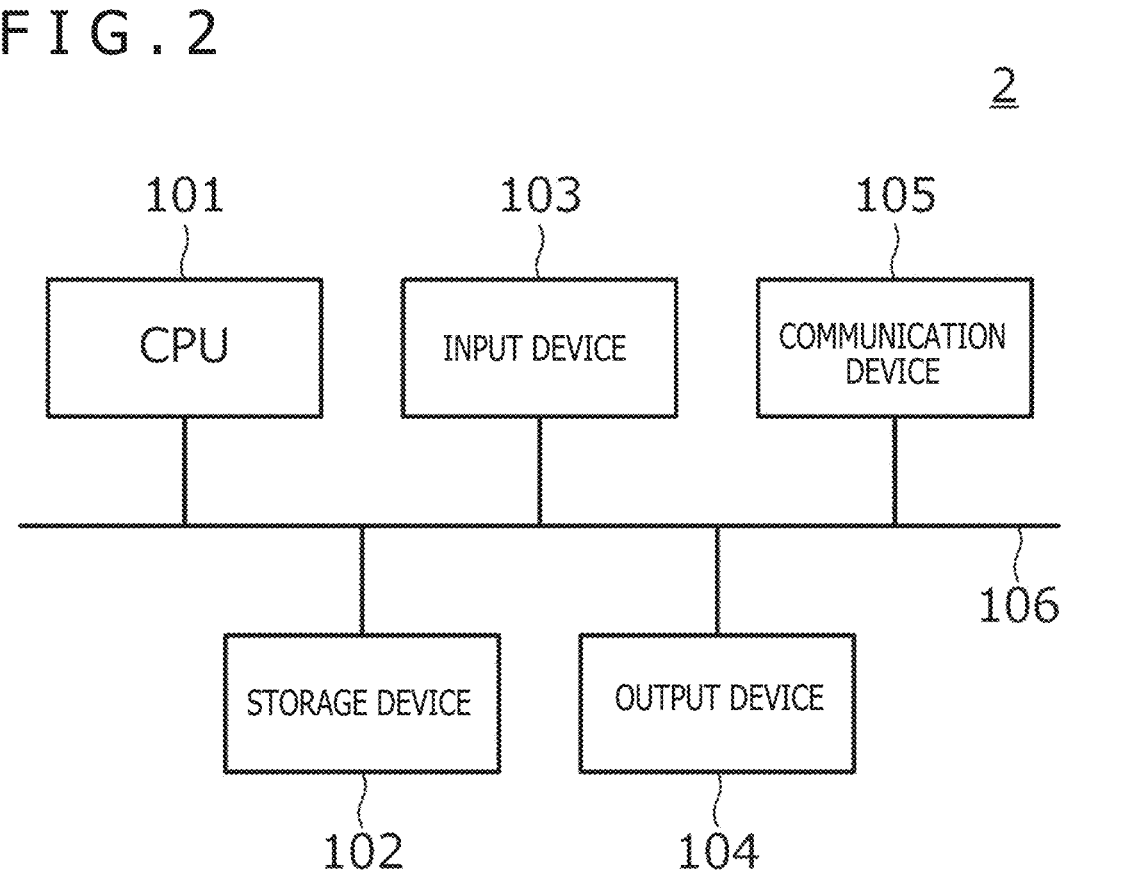
FIG. 2 depicts an example of a hardware configuration of an image processing apparatus.

FIG. 2 depicts an example of a hardware configuration of the image processing apparatus 2. As illustrated in FIG. 2, the image processing apparatus 2 includes a central processing unit (CPU) 101, a storage device 102, an input device 103, an output device 104, and a communication device 105. Note that the type of the image processing apparatus 2 is not particularly limited to a specific type. The image processing apparatus 2 can include various types of computers, such as a notebook personal computer, a desktop personal computer, a tablet personal computer, a smartphone, and a server computer.

The CPU 101 is a processor that controls the components of the image processing apparatus 2 and that reads various programs (e.g., including processor-readable instructions)

stored in the storage device 102 and execute the programs. The CPU 101 executes the programs stored in the storage device 102, to realize the processes executed by the image processing apparatus 2 described later.

The storage device 102 is a device including a main storage device, such as a dynamic random access memory (DRAM), and an auxiliary storage device, such as a hard disk. The storage device 102 plays a role of storing various programs for executing an operating system of the image processing apparatus 2 and various applications and plays a role of storing data used by the programs. The applications stored in the storage device 102 include the XR application.

The input device 103 is a device that receives an input operation made by the user and supplies the input operation to the CPU 101. The input device 103 includes, for example, a keyboard, a mouse, and a touch panel. The camera 3 and the controller P are each an example of the input device 103. The camera 3 plays a role of inputting, to the image processing apparatus 2, the image obtained by photographing. The controller P plays a role of causing the image processing apparatus 2 to detect the position (position in the XR space) and the posture of the controller P to thereby input the position and the posture to the image processing apparatus 2. The image processing apparatus 2 generates the 3D object of the controller P on the basis of the detected position and posture of the controller P and executes processes such as moving a cursor and generating stroke data. Note that the controller P may be a position indicator for the touch panel that is the input device 103 of the image processing apparatus 2. The touch panel in this case plays a role of detecting the position of the controller P on the touch surface and supplying the detected position to the image processing apparatus 2.

The output device 104 is a device that outputs the processing result of the CPU 101 to the user, and the output device 104 includes, for example, a display and a speaker. The head-mounted display 4 is an example of the output device 104. The communication device 105 is a device for communicating with external devices including the camera 3, the controller P, and the head-mounted display 4, and the communication device 105 transmits and receives data to and from the external devices according to the control of the CPU 101.

Figure 3:
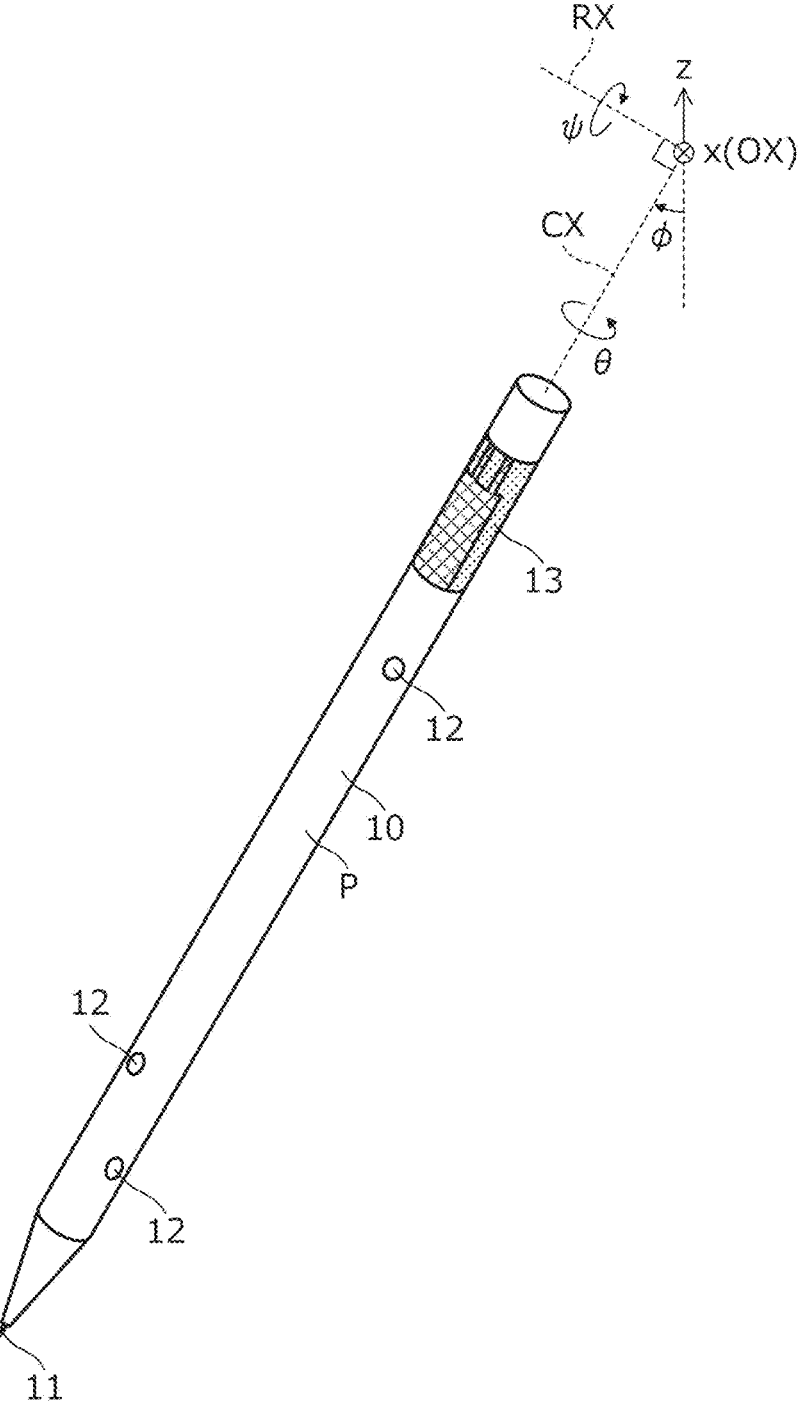
FIG. 3 is an enlarged perspective view of the pen-shaped controller.

FIG. 3 is an enlarged perspective view of the controller P. As illustrated in FIG. 3, the controller P includes a housing 10 formed in, for example, a cylindrical shape and a position indicator 11 that is provided at the front end of the housing 10 that indicates a position in a space. The user holds the housing 10 with one hand to operate the controller P. In this way, the user moves the position indicator 11 to indicate the position in the space. A plurality of light emitting diodes 12 that use power supplied from a battery of the controller P and emit light and a marker 13 including predetermined figures are arranged on the surface of the controller P.

The plurality of light emitting diodes 12 are provided to cause the image processing apparatus 2 to detect the position of the controller P, and the plurality of light emitting diodes 12 are arranged in a predetermined arrangement pattern on the surface of the controller P. The image processing apparatus 2 is configured to detect a pattern of light coinciding with the arrangement pattern of the light emitting diodes 12 in the image supplied from the camera 3 and calculate the distance between the camera 3 and the controller P on the basis of the apparent size of the pattern to thereby detect the position of the controller P in the XR space. The number of light emitting diodes 12 attached to the surface of the controller P and specific attachment locations of the light emitting diodes 12 are determined to allow the image processing apparatus 2 to detect the position of the controller P even when only some of the plurality of light emitting diodes 12 appear in the image due to a situation in which, for example, the light emitting diodes 12 are hidden by the hand of the user.

The marker 13 is provided for the image processing apparatus 2 to detect the posture of the controller P, and the marker 13 is arranged to surround the entire circumference on the side surface closer to the back end of the housing 10. The reason why the marker 13 is arranged closer to the back end of the housing 10 is to prevent the hand of the user holding the controller P from hiding the marker 13. The detection of the posture of the controller P with use of the marker 13 is specifically executed by detecting a roll angle θ, a yaw angle φ, and a pitch angle ψ illustrated in FIG. 3. The roll angle θ is a rotation angle about a housing shaft CX (cylindrical shaft) of the housing 10. The yaw angle φ is a rotation angle about the optical axis OX of the camera 3. The pitch angle ψ is a rotation angle about a rotation axis RX orthogonal to the optical axis OX and the housing shaft CX. Details of the method of detecting them will be described later.

Figure 4A:
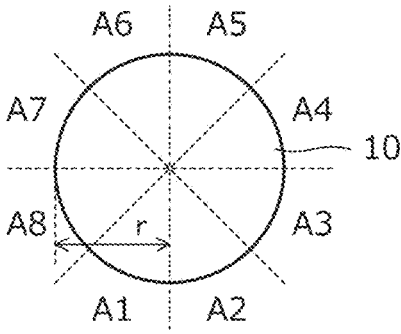
FIGS. 4A to 4C are diagrams for describing a marker.
Figure 4B:
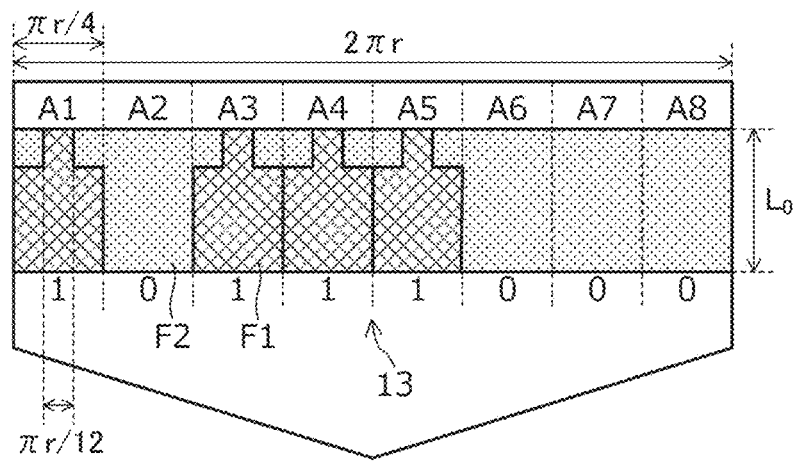
Figure 4C:
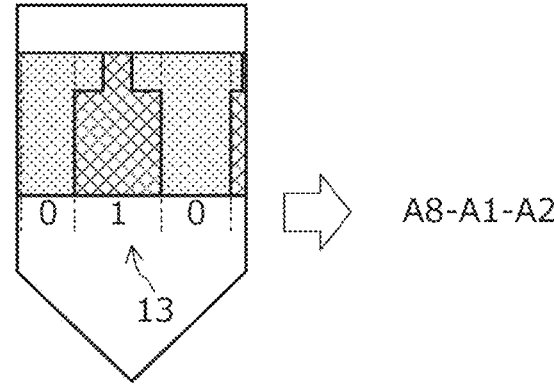

FIGS. 4A to 4C are diagrams for describing the marker 13. FIG. 4A is a cross-sectional view of the housing 10 cut in a plane orthogonal to the housing shaft CX. FIG. 4B is a schematic development view of the side surface of the controller P. FIG. 4C is a schematic view of the side surface of the controller P. The configuration of the marker 13 and the detection method of the roll angle θ will be described in detail with reference to FIGS. 4A to 4C and also to FIGS. 5A to 6 described later.

As illustrated in FIGS. 4A and 4B, the marker 13 includes a plurality of areas A1 to A8 arranged at an equal pitch along a circling direction (circumferential direction) on the side surface of the housing 10. The areas A1 to A8 will be collectively referred to as areas A in some cases when the areas A1 to A8 do not have to be distinguished from one another. Although the following description is based on the assumption that the marker 13 includes eight areas A, the number of areas A included in the marker 13 may not be eight. That is, the number of areas A is a parameter for determining the detection resolution of the roll angle θ, and when the marker 13 includes n areas A, the detection resolution of the roll angle θ is 360°/n. Therefore, the number of areas A can be determined based on the necessary detection resolution of the roll angle θ.

The areas A are rectangular areas of the same size. The pitch of arrangement of the areas A is πr/4 where r represents the radius of the housing 10. The width of the areas A in the circling direction may also be πr/4, and in this case, two adjacent areas A are arranged in close contact with each other. However, the width of the areas A in the circling direction may be a value smaller than πr/4, and two adjacent areas A may be separated from each other.

One of a first figure F1 and a second figure F2 is arranged in each area A. In the example illustrated in FIG. 4B, the areas A1 and A3 to A5 include the first figures F1, and the areas A2 and A6 to A8 include the second figures F2.

The first figure F1 is a non-point symmetrical figure including a protrusion or a depression as illustrated in FIG. 4B. The reason why the first figure F1 is formed in this way is to make it possible to use the first figure F1 to determine the front end side and the back end side of the controller P when the controller P is viewed in the image of the camera 3. In the example illustrated in FIG. 4B, the first figure F1 includes a first part that is a rectangle with the same width $\pi r/4$ as the area A and a second part (protrusion portion) that is a rectangle with a width of $\pi r/12$ protruding from the center of the top side of the first part (side closer to the back end of the controller P). A length $L_0$ illustrated in FIG. 4B is the width of the first figure F1 in the direction of the housing shaft CX, and the length $L_0$ is stored in advance as a reference length $L_0$ in the storage device 102 illustrated in FIG. 2. The reference length $L_0$ stored in the storage device 102 in this way is used by the controller P to calculate the pitch angle $\psi$, and this will be described in detail later.

FIGS. 5A to 5C depict other examples of the first figure F1. In the example illustrated in FIG. 5A, the first figures F1 are based on rectangles in which the long sides are parallel to the housing shaft CX and the length of the short sides is smaller than the width of the areas A in the circling direction. Various figures (such as a circle, a triangle, a rectangle, and a square) with the width of the areas A in the circling direction larger than the width of the rectangles are added to the rectangles such that the first figures F1 become non-point symmetrical as a whole. In the example illustrated in FIG. 5B, the first figures F1 are based on ellipses in which the major axes are parallel to the housing shaft CX and the length of the minor axes is smaller than the width of the areas A in the circling direction. Figures (such as a circle, a triangle, and a rectangle) with the width of the areas A in the circling direction larger than the width of the ellipses are added to the ellipses such that the first figures F1 become non-point symmetrical as a whole. In the example illustrated in FIG. 5C, the first figures F1 are formed by making rectangular or elliptical cuts in various figures, such as a circle, a triangle, a rectangle, and a square, from the centers of the sides closer to the back end of the controller P or from the corners. Although the specific shapes of the first figures F1 can be various shapes, the shapes are not limited to the shapes illustrated in FIGS. 5A to 5C, and it is only necessary that the first figures F1 be non-point symmetrical figures including protrusions or depressions.

FIGS. 4A to 4C will be further described. The second figure F2 is a figure in a predetermined color (more specifically, a figure obtained by painting the entire corresponding area A in a background color). The area A is a rectangle, and therefore, the second figure F2 is also a rectangle. Note that the background color of the marker 13 may be the same color as that of the side surface of the housing 10 or may be a different color. When the background color of the marker 13 is the same color as that of the side surface of the housing 10, nothing is apparently arranged on the part of the second figure F2 from the viewpoint of the user. The second figure F2 may be a non-point symmetrical figure including a protrusion or a depression as in the first figure F1. However, the first figure F1 and the second figure F2 need to be figures in different shapes in this case.

The first figure F1 and the second figure F2 indicate different bits as illustrated in FIG. 4B, and therefore, the marker 13 includes a code for the image processing apparatus 2 to detect the roll angle $\theta$ of the controller P. In the example illustrated in FIG. 4B, the first figure F1 is associated with a bit "1," and the second figure F2 is associated with a bit "0." However, it is obvious that the bits may be the opposite.

The image of the controller P included in the image acquired by the image processing apparatus 2 from the camera 3 includes at least three areas A as in FIG. 4C. The figures indicated by three areas A included in the image include a combination of areas A, and the types of figures (first figure F1 and second figure F2) arranged in the areas A are selected such that the figures vary in each combination of areas A (in other words, such that the figures do not overlap with respect to the rotation about the housing shaft CX). The arrangement of the figures illustrated in FIG. 4B is an example of such selection.

Table 1 represents 3-bit codes expressed by three areas A appearing in the image when the first figures F1 and the second figures F2 are arranged in the areas A as illustrated in FIG. 4B. It can be understood from Table 1 that the code varies according to the combination of three areas A and that, therefore, three areas A appearing in the image can be determined from the code indicated by the figures appearing in the image. It can also be understood that the roll angle $\theta$ can be acquired based on the code as indicated in Table 1 where the roll angle $\theta$ is 0° when the area A1 is viewed right in front.

TABLE 1

| Three areas A appearing in image | Code | Roll angle $\theta$ |
|---|---|---|
| A8-A1-A2 | 010 | 0° |
| A1-A2-A3 | 101 | 45° |
| A2-A3-A4 | 011 | 90° |
| A3-A4-A5 | 111 | 135° |
| A4-A5-A6 | 110 | 180° |
| A5-A6-A7 | 100 | 225° |
| A6-A7-A8 | 000 | 270° |
| A7-A8-A1 | 001 | 315° |

The image processing apparatus 2 detects the marker 13 appearing in the image supplied from the camera 3 and acquires the combination of figures appearing in the marker 13. The image processing apparatus 2 decodes the acquired combination of figures to acquire the 3-bit code and acquires the roll angle $\theta$ of the controller P on the basis of the acquired code. In this way, according to the controller P of the present embodiment, the image processing apparatus 2 can acquire the roll angle $\theta$ of the controller P from the image of the controller P because the marker 13 is arranged on the surface.

FIG. 6 is a process flow chart illustrating a process executed by the image processing apparatus 2 to acquire the roll angle $\theta$ of the controller P. As illustrated in FIG. 6, the image processing apparatus 2 first acquires the image from the camera 3 (S1) and then detects the marker 13 included in the image (S2). The marker 13 detected in this way is usually distorted, and therefore, the image processing apparatus 2 executes a process of correcting the distortion of the marker 13 (S3).

Specifically, machine learning or an inverse transformation of affine transformation can be used to execute the process of S3. To use the machine learning, the storage device 102 (see FIG. 2) of the image processing apparatus 2 can learn in advance the images of the marker 13 photographed from various angles under various conditions, in association with the images of the marker 13 viewed from the front. The image processing apparatus 2 searches the storage device 102 for the image most similar to the image of the marker 13 detected at S2 and acquires, as a corrected image, the image (image of the marker 13 viewed from the front) corresponding to the matched image.

On the other hand, to use the inverse matrix of affine transformation, the images of the marker 13 viewed from the front at various angles about the housing shaft CX are stored in advance in the storage device 102 of the image processing apparatus 2. The image processing apparatus 2 applies various affine transformations to the images and determines the affine transformation in which the resultant image is most similar to the image of the marker 13 detected at S2. The image processing apparatus 2 applies the inverse transformation of the determined affine transformation to the image of the marker 13 detected at S2, to acquire a corrected image.

The image processing apparatus 2 then determines the direction of the controller P in the corrected image (S4). Specifically, the image processing apparatus 2 can detect the first figure F1 from the image and determine the direction of the controller P on the basis of the shape of the first figure F1. In the example of the first figure F1 illustrated in FIG. 4B, the image processing apparatus 2 can detect the first part and the second part from the detected first figure F1. The image processing apparatus 2 can determine that the side where the first part is positioned is the front end side of the controller P and determine that the side where the second part is positioned is the back end side of the controller P.

The image processing apparatus 2 then decodes the marker 13 on the basis of the direction of the controller P determined at S4 (S5). Specifically, the image processing apparatus 2 determines three areas A most visible in the corrected image and converts the figures included in the areas A into bit values. The image processing apparatus 2 acquires a 3-bit code by arranging the obtained three bit values from the left side where the front end side of the controller P is the lower side.

Lastly, the image processing apparatus 2 calculates the roll angle θ of the controller P on the basis of the result of decoding (3-bit code) obtained at S5 (S6). Specifically, the image processing apparatus 2 can convert the 3-bit code into the roll angle θ on the basis of Table 1 to acquire the roll angle θ of the controller P. The detection of the roll angle θ by the image processing apparatus 2 is completed in the process so far.

Figure 7:
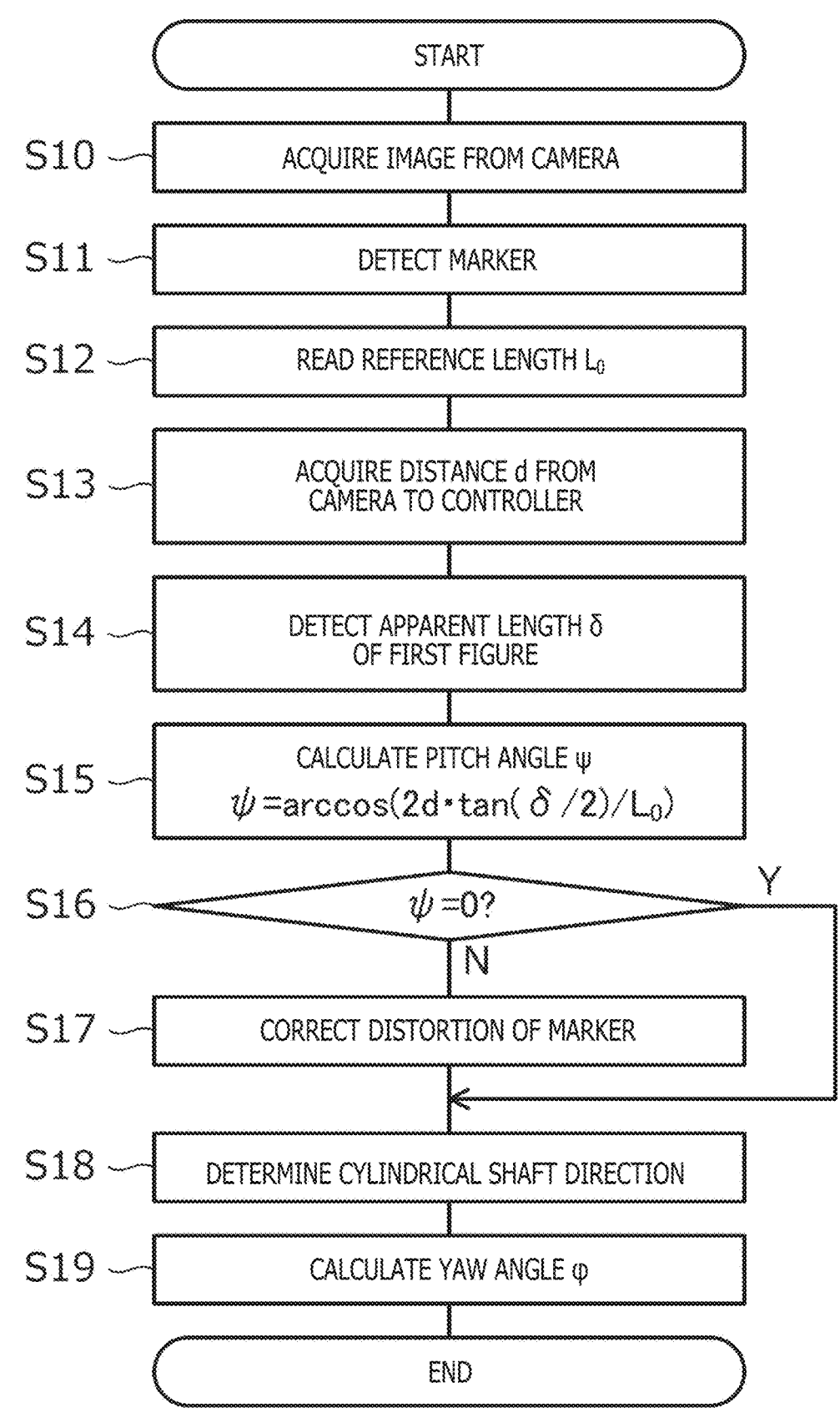
FIG. 7 is a process flow chart illustrating a process executed by the image processing apparatus to acquire a yaw angle and a pitch angle of the controller.

The detection method of the yaw angle φ and the pitch angle ψ will be described. FIG. 7 is a process flow chart illustrating a process executed by the image processing apparatus 2 to acquire the yaw angle φ and the pitch angle ψ of the controller P. As illustrated in FIG. 7, the image processing apparatus 2 first acquires the image from the camera 3 (S10) and then detects the marker 13 included in the image (S11). The process so far is similar to S1 and S2 executed in the case of acquiring the roll angle θ.

The image processing apparatus 2 reads the reference length $L_0$ (see FIGS. 4A to 4C) from the storage device 102 (see FIG. 2) (S12). The image processing apparatus 2 acquires a distance d between the camera 3 and the controller P on the basis of the position of the controller P detected based on the arrangement of light of the light emitting diodes 12 illustrated in FIG. 3 (S13) and further acquires an apparent length δ of the first figure F1 in the direction of the housing shaft CX as viewed from the camera 3 (S14). The unit of δ is the angle. The image processing apparatus 2 calculates the pitch angle ψ of the controller P on the basis of the acquired values (S15). Specifically, the image processing apparatus 2 can use the following Equation (1) to calculate the pitch angle ψ.

$$\psi = \arccos \frac{2d \tan\left(\frac{\delta}{2}\right)}{L_0} \tag{1}$$

Note that the image processing apparatus 2 may perform calibration or the like before the start of the use of the controller P to acquire in advance a length $L_1$ of the first figure F1 in the direction of the housing shaft CX as viewed from the camera 3 where the pitch angle ψ is zero. The image processing apparatus 2 may use the length $L_1$ and an apparent length L (the unit of L is the length) of the first figure F1 in the direction of the housing shaft CX as viewed from the camera 3, to calculate the pitch angle ψ with the following Equation (2).

$$\psi = \arccos \frac{L}{L_1} \tag{2}$$

Methods other than these may be used to calculate the pitch angle ψ. For example, the image processing apparatus 2 may use a change in the ratio of the top side (side positioned closer to the back end of the controller P) to the bottom side (side positioned closer to the front end of the controller P) of the first figure F1 or a change in the aspect ratio of the first figure F1 to calculate the pitch angle ψ.

The image processing apparatus 2 determines whether or not the pitch angle ψ calculated at S15 is zero (S16). The image processing apparatus 2 that has determined that the pitch angle ψ is zero as a result of the determination advances the process to S18. On the other hand, the image processing apparatus 2 that has determined that the pitch angle ψ is not zero executes a process of correcting the distortion of the marker 13 (S17) and advances the process to S18. The process of correcting the distortion may be a process similar to the process described at S3 of FIG. 6.

At S18, the image processing apparatus 2 determines the direction of the housing shaft CX on the basis of the extension direction of the first figure F1. Specifically, the image processing apparatus 2 first executes a process similar to S4 of FIG. 6 to determine the direction of the controller P and thereby determine the top side (side positioned closer to the back end of the controller P) and the bottom side (side positioned closer to the front end of the controller P) of the first figure F1. The image processing apparatus 2 then obtains the positions of the midpoints of the top side and the bottom side and determines that the direction connecting the obtained midpoints is the direction of the housing shaft CX. Note that, when, for example, sufficient accuracy cannot be obtained just by the midpoint of the top side and the midpoint of the bottom side, the image processing apparatus 2 may also obtain the midpoint of the top side of the first part (or the bottom side of the second part) of the first figure F1. The image processing apparatus 2 may use the least squares method to obtain the line segment connecting the three midpoints and determine that the extension direction of the obtained line segment is the direction of the housing shaft CX.

Machine learning may be used to determine the direction of the housing shaft CX at S18. In this case, the images of the marker 13 photographed from various angles and the directions of the housing shaft CX are associated with each other and stored in advance in the storage device 102 (see FIG. 2) of the image processing apparatus 2. The image processing apparatus 2 can search the storage device 102 for the image most similar to the image of the marker 13 detected at S11 and acquire, as the direction of the housing shaft CX, the direction stored in association with the matched image.

The image processing apparatus 2 that has determined the direction of the housing shaft CX calculates the angle between the determined direction of the housing shaft CX and the vertical direction (up-and-down direction of the image) to calculate the yaw angle φ of the controller P (S19). The detection of the yaw angle φ and the pitch angle ψ by the image processing apparatus 2 is completed in the process so far.

As described above, according to the controller P of the present embodiment, the image processing apparatus 2 can use the marker 13 arranged on the surface, to detect the posture (specifically, the roll angle θ, the yaw angle φ, and the pitch angle ψ) of the controller P, even though the controller P is a pen-shaped controller with a small surface area.

Although the preferred embodiment of the present disclosure has been described, the present disclosure is not limited to the embodiment in any way, and it is obvious that the present disclosure can be carried out in various modes without departing from the scope of the present disclosure.

For example, although there is one camera 3 in the description of the embodiment, a plurality of cameras 3 may be used in consideration of the possibility that the controller P is blocked by an obstacle. In this case, the image processing apparatus 2 may detect the position of the controller P on the basis of the image with the largest number of light emitting diodes 12 among the images photographed by the cameras 3 and detect the posture of the controller P on the basis of the image in which the marker 13 is most visible. In addition, the angles from the cameras 3 to the controller P may be detected, and triangulation based on the detected angles may be performed to detect the position of the controller P.

Although the housing 10 is cylindrical in the example described in the embodiment, the housing 10 may have a shape other than the cylindrical shape, such as a shape with a rounded triangle in cross section, in consideration of ergonomics and the like.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A controller comprising:
a housing having a cylindrical shape; and
a position indicator that is provided at a front end of the housing and comprises a physical tip configured to indicate a position in a three-dimensional (3D) space when a user moves the housing,
wherein the housing includes a marker provided along a circumferential direction of the housing on a side surface of the housing,
wherein the marker includes a plurality of regions arranged along the circumferential direction of the housing, each of the regions including one of a first figure or a second figure different from the first figure, wherein the first figure does not have point symmetry and includes a protrusion or a depression, and
wherein the first figure or the second figure included in each of the regions arranged along the circumferential direction of the housing are arranged in a sequence that indicates a binary code that enables detection of a rotation angle about a housing shaft of the housing.

2. The controller according to claim 1 wherein the second figure is a figure in a predetermined color.

3. The controller according to claim 1 wherein
the marker is included in an image photographed by a camera, and
the plurality of regions of the marker includes different combinations of the first figure and the second figure.

4. The controller according to claim 1, wherein
the marker is arranged at a position where the marker is not hidden by a hand of the user when the user holds the housing.

5. The controller according to claim 1, wherein
the marker is arranged closer to a back end of the housing than to the front end of the housing.

6. A computer that detects a posture of a controller, the controller including a housing having a cylindrical shape, and a position indicator that is provided at a front end of the housing and comprises a physical tip configured to indicate a position in a three-dimensional (3D) space when a user moves the housing, and the controller including a marker provided along a circumferential direction of the housing on a side surface of the housing, the marker including a plurality of regions arranged along the circumferential direction, each of the regions including one of a first figure or a second figure different from the first figure, the first figure not having point symmetry and including a protrusion or a depression, the first figure or the second figure included in each of the regions arranged along the circumferential direction of the housing being arranged in a sequence that indicates a binary code enables detection of a roll angle that is a rotation angle about a housing shaft of the housing, the computer comprising:
a processor; and
a memory storing instructions that, when executed by the processor, cause the computer to:
acquire an image of the controller through an imaging device,
decode the marker included in the image, and
detect the roll angle based on a result of decoding the marker.

7. The computer according to claim 6, wherein
the instructions, when executed by the processor, cause the computer to:
acquire a reference length of at least one of the first figure or the second figure in an axial direction of the housing,
acquire a distance from the imaging device to the controller,
detect an apparent length of the at least one of the first figure or the second figure included in the image, and
detect a pitch angle that is a rotation angle about a rotation axis orthogonal to an optical axis of the imaging device and the housing shaft, based on the reference length, distance, and apparent length.

8. The computer according to claim 7, wherein
the instructions, when executed by the processor, cause the computer to:
determine a direction of the housing shaft based on an extension direction of the at least one of the first figure or the second figure, and detect a yaw angle that is a rotation angle about the optical axis of the imaging device, based on a vertical direction and the direction of the housing shaft.

\* \* \* \* \*